F. L. BARBER & C. S. WALTON.
SIDE BEARING FOR CARS.
APPLICATION FILED APR. 19, 1916.

1,192,032.

Patented July 25, 1916.
2 SHEETS—SHEET 1.

Witnesses.
E. C. Wells
A. H. Opsahl

Inventors
Franklin L. Barber
C. S. Walton
By their Attorneys

F. L. BARBER & C. S. WALTON.
SIDE BEARING FOR CARS.
APPLICATION FILED APR. 19, 1916.
1,192,032.
Patented July 25, 1916.
2 SHEETS—SHEET 2.
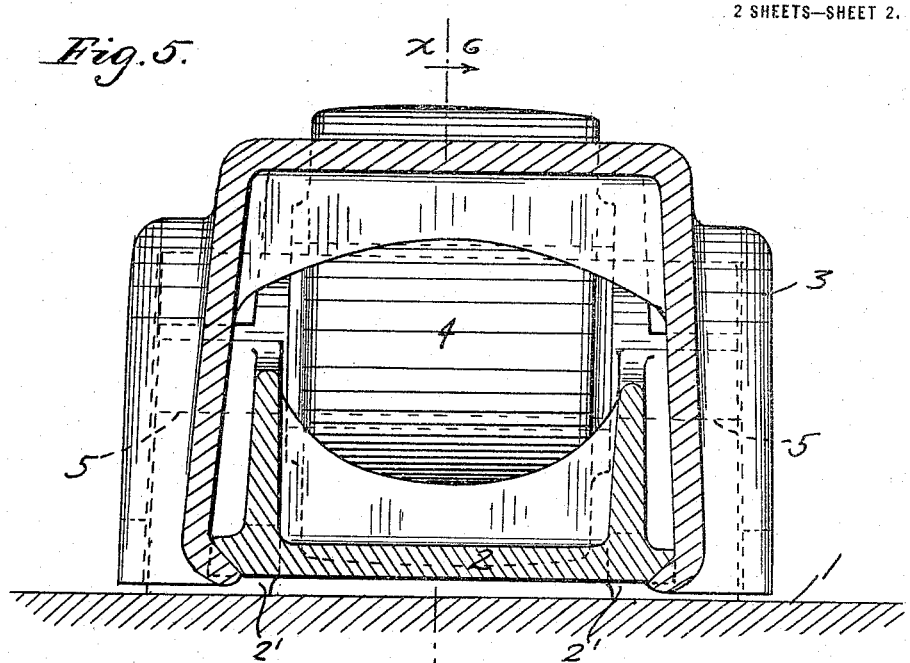
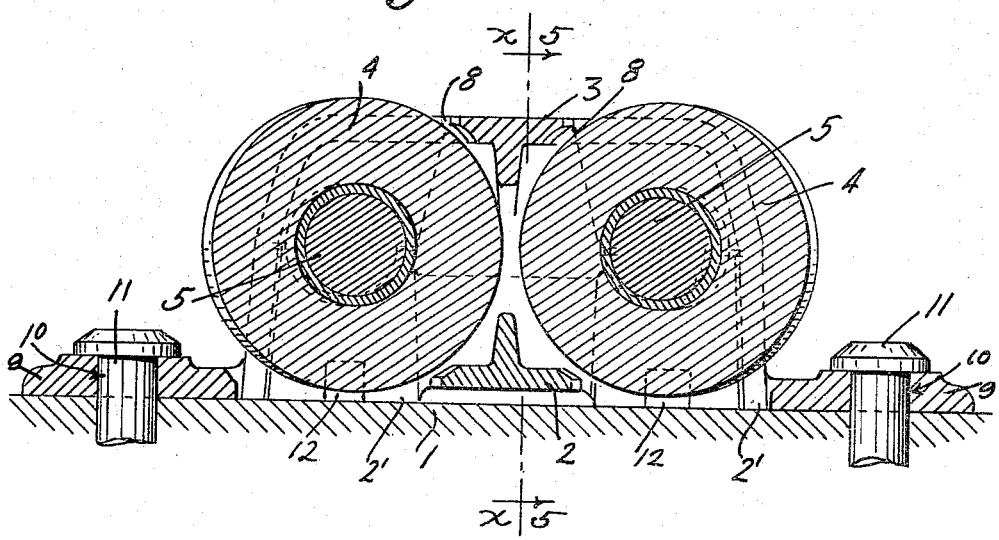
Witnesses
E. C. Wells
A. H. Opsahl
Inventors
Franklin L. Barber
C. S. Walton
By their Attorneys

UNITED STATES PATENT OFFICE.

FRANKLIN L. BARBER AND CHARLES S. WALTON, OF CHICAGO, ILLINOIS, ASSIGNORS TO STANDARD CAR TRUCK COMPANY, OF CHICAGO, ILLINOIS, A CORPORATION OF NEW JERSEY.

SIDE BEARING FOR CARS.

1,192,032.  Specification of Letters Patent.  Patented July 25, 1916.

Application filed April 19, 1916. Serial No. 92,295.

*To all whom it may concern:*

Be it known that we, FRANKLIN L. BARBER and CHARLES S. WALTON, citizens of the United States, residing at Chicago, in the county of Cook and State of Illinois, have invented certain new and useful Improvements in Side Bearings for Cars; and we do hereby declare the following to be a full, clear, and exact description of the invention, such as will enable others skilled in the art to which it appertains to make and use the same.

Our invention has for its object to provide an improved side bearing for railway cars; and, to such ends, generally stated, the invention consists of the novel devices and combinations of devices hereinafter described and defined in the claims.

In the accompanying drawings, which illustrate the invention, like characters indicate like parts throughout the several views.

Figure 1:
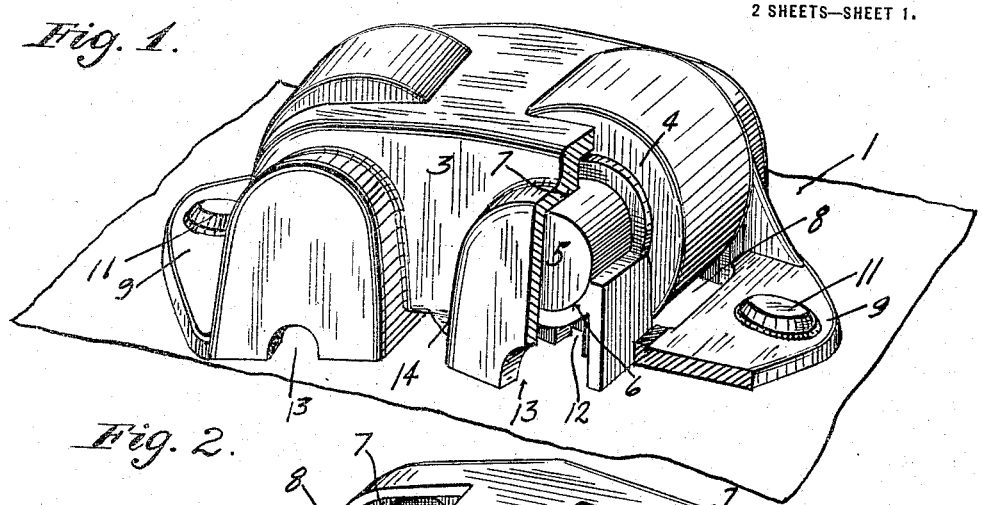
Figure 2:
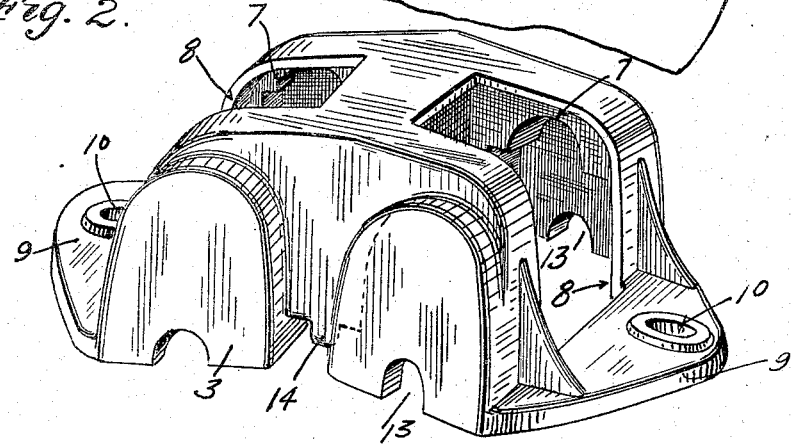
Figure 3:
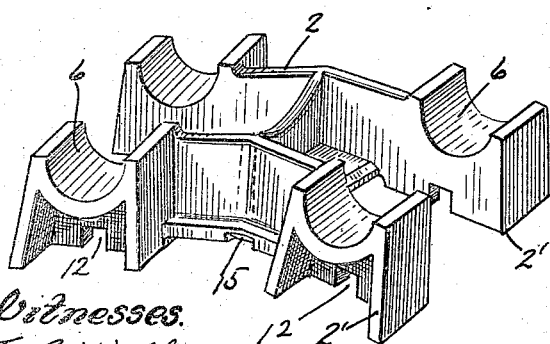
Figure 4:
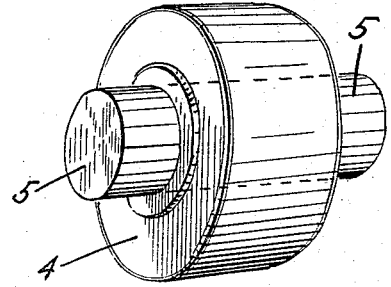

Referring to the drawings,—Figure 1 is a perspective view of the improved side bearing secured to a car bolster or other support, diagrammatically illustrated; Fig. 2 is a perspective view of the housing member of the side bearing; Fig. 3 is a perspective view of the base member thereof; Fig. 4 is a perspective view of one of the rollers and the pin on which it is journaled; Fig. 5 is a transverse section taken on the line $X^5 X^5$ of Fig. 6; and Fig. 6 is a longitudinal section, taken on the line $X^6 X^6$ of Fig. 5.

The numeral 1 indicates a support such as the truck or body bolster of a railway car, to which the invention is secured. For sake of convenience, the support 1 will hereinafter be termed a "bolster". The improved side bearing comprises a base member 2, a housing 3 and a pair of rollers 4, journaled, each on a heavy pin 5.

The base member 2 is bifurcated at each end, is in the form of an H-shape casing, suitably ribbed, and has formed in its end portions or prongs, pairs of axially spaced and axially alined half-seats 6. Short heavy legs 2′, integrally formed with the base 2, are located, one directly under each half-seat 6, rest upon the bolster 1 and support said base member slightly thereabove. The end portions of the pins 5 are journaled in the half-seats 6 and the rollers 4 are journaled, one upon the intermediate portions of each pin 5, with freedom to rotate between the prongs of the base member 2, but are held thereby against axial movement. The rollers 4 and pins 5 may be lifted radially from the half-seats 6 or said pins may be removed axially from the rollers 4 and half-seats 6.

The housing 3 is open at its bottom, incases the base member 2, and has formed in its side walls half-seats 7, which coöperate with the half-seats 6 to complete the seats for the pins 5. In the top and side walls of the housing 3 are formed two passageways 8, within which the rollers 4 rotate, with their upper surfaces located slightly above the flat top surface of said housing. The lower edge portion of the housing 3 rests directly upon the bolster 1 and integrally formed with each end thereof is a wide base flange 9. These base flanges 9 also rest directly upon the bolster 1 and have formed therein holes 10 through which and alined holes in the bolster 1 rivets 11 are passed for securing the housing 3, and hence the improved side bearing to the bolster 1.

Obviously the housing 3 cages the base member 2, holds the same against endwise or lateral movements upon the bolster 1 and also against lifting movement therefrom. The walls of the housing 3 also hold the pins 5 against axial displacement from the rollers 5 and seats 6—7.

Sand and dirt, working its way into the side bearing, will be precipitated onto the bolster 1 and work its way out, through pairs of alined openings 12 and 13, formed respectively in the base member 2 and housing 3 under each half-seat 6. In some instances, when the bolster 1 is provided with an opening directly under the rollers 4, a portion of the sand and dirt entering the side bearing will be precipitated therethrough.

The several parts of the improved side bearing are held in assembled relation, as an entirety, as best shown in Figs. 1 and 5, by means of a pair of lugs 14, adapted to be bent laterally into notches 15, formed in the side walls of the base member 2, as best shown in Fig. 3. The lugs 14 are integrally formed, one with each side wall of the housing 3 at the longitudinal center thereof. With the lugs 14 bent into the notches 15, the base member 2 and housing 3 are held in an assembled relation and with the rollers 4 and pins 5 held therebetween, so that no part of the improved side bearing can become separated or lost.

As previously stated, the base member 2 rests directly on the bolster 1 and receives all of the weight, except in case one of the rollers 4 is broken and lost, in which case the smooth top surface of the housing 3 becomes a temporary bearing.

In supporting the base member 2 on its legs 2', slightly above the bolster 1, the same is held firmly in place against rocking movement and the weight on each half bearing 6 is transmitted directly to the bolster 1.

What we claim is:

1. A side bearing for cars comprising a base member, a roller journaled on the base member, a housing incasing the base member, and means for securing the housing to a support.

2. A side bearing comprising a base member, a roller journaled on the base member with freedom for radial displacement, a housing incasing the base member and holding the roller against lateral displacement therefrom, and means for securing the housing to a support.

3. A side bearing comprising a base member, a pin journaled on the base member with freedom for axial or lateral displacement, a roller on the pin, a housing incasing the base member and holding said pin against both endwise and lateral displacement therefrom, and means for securing the housing to a support.

4. A side bearing for cars comprising a base member, a roller journaled on the base member, a housing incasing the base member and having interlocking engagement therewith for holding the members of the side bearings assembled as an entirety, and means for securing the housing to a support.

5. A side bearing for cars comprising a base member, a housing incasing the base member, coöperating half-seats formed in the base member and housing, a roller having trunnions journaled in said coöperating half-seats, and means for securing the housing to a support.

6. A side bearing for cars comprising an H-shaped base member having in its end portions axially alined seats, a roller having trunnions journaled in said seats, a housing incasing the base member, and means for securing the housing to a support.

7. A side bearing for cars comprising a base member, a roller journaled on the base member, a housing incasing the base member and having a lug adapted to be bent into engagement therewith for holding the members of the side bearing assembled as an entirety, and means for securing the housing to a support.

8. A side bearing for cars comprising a base member, a roller journaled on the base member, a housing incasing the base member and having a smooth top with a passageway through which said roller extends, a means for securing the housing to a support.

9. The combination with a support, of a side bearing comprising a base member having at each end a pair of axially spaced seats and resting on the support at points under said seats, the intermediate portion of said base member being spaced above the support, a roller mounted between each pair of seats and having trunnions journaled therein, a housing incasing the base member and means for securing the housing to the support.

10. The combination with a support, of a side bearing for cars, comprising a base member, a housing incasing the base member and having openings for the escape of dirt, and means for securing the housing to the support.

11. The combination with a support, of a side bearing for cars comprising a base member, a roller journaled on the base members, a housing incasing the base member, said base member and housing having openings for the escape of dirt, and means for securing the housing to the support.

In testimony whereof we affix our signatures in presence of two witnesses.

FRANKLIN L. BARBER.
CHARLES S. WALTON.

Witnesses:
LEE W. BARBER,
HARRIET E. ORR.

Copies of this patent may be obtained for five cents each, by addressing the "Commissioner of Patents, Washington, D. C."